US008042435B2

(12) United States Patent
Thompson et al.

(10) Patent No.: US 8,042,435 B2

(45) Date of Patent: Oct. 25, 2011

(54) SPECIAL ARTICULATING TOOL HOLDER

(76) Inventors: Ray P. Thompson, Middletown, IN (US); Jerry A. Arnold, Lapel, IN (US); Wayne A Crandall, Pendleton, IN (US)

( * ) Notice: Subject to any disclaimer, the term of this patent is extended or adjusted under 35 U.S.C. 154(b) by 221 days.

(21) Appl. No.: 12/313,742

(22) Filed: Nov. 24, 2008

(65) Prior Publication Data

US 2010/0139808 A1 Jun. 10, 2010

Related U.S. Application Data

(60) Provisional application No. 61/004,276, filed on Nov. 26, 2007.

(51) Int. Cl.
*B23B 13/00* (2006.01)
*E04G 3/00* (2006.01)

(52) U.S. Cl. ................................ 82/18; 82/157; 82/158

(58) Field of Classification Search ................ 82/18, 19, 82/11, 157, 158, 117; 142/45; 248/278.1
See application file for complete search history.

(56) References Cited

U.S. PATENT DOCUMENTS

| | | | | |
|---|---|---|---|---|
| 4,305,439 | A | 12/1981 | Skinner | |
| 4,658,485 | A | 4/1987 | Yang | |
| 4,838,135 | A * | 6/1989 | Hevoyan | 82/124 |
| 5,213,292 | A * | 5/1993 | Evans | 248/123.11 |
| 5,280,892 | A * | 1/1994 | Smith | 269/75 |
| 5,547,319 | A | 8/1996 | Pollak | |
| 7,055,789 | B2 | 6/2006 | Libbey et al. | |
| 7,083,571 | B2 * | 8/2006 | Wang et al. | 600/102 |
| 7,325,777 | B2 * | 2/2008 | Thiessen | 248/278.1 |
| 2008/0033240 | A1 * | 2/2008 | Hoffman et al. | 600/109 |

OTHER PUBLICATIONS

Elbotool.com, 2008.

* cited by examiner

*Primary Examiner* — Will Fridie, Jr.

(74) *Attorney, Agent, or Firm* — John D. Ritchison

(57) ABSTRACT

This is a tool device called a Special Articulating Tool Holder for a Lathe. The device provides a new and unique device to permit deep hollowing of wood or other materials with a controlled, repeatable method. The preferred embodiment of the device is comprised of multiple (two or more) articulating joints—the first of the multiple articulating joints is secured to a tool holder with features to hold cutting tools—and the last of the multiple articulating joints is secured to an essentially vertical mounting post. The mounting post is held in place by a base means which mounts either horizontally or vertically to the machine base as determined by the machine configuration.

4 Claims, 5 Drawing Sheets

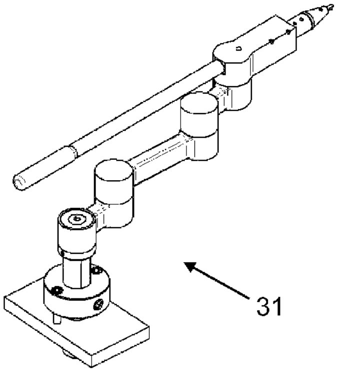
Fig. 1 A
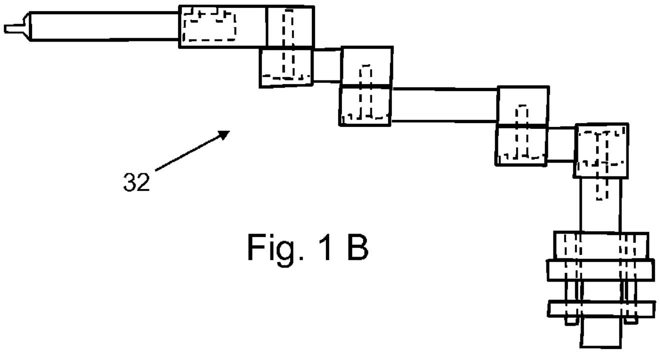
Fig. 1 B
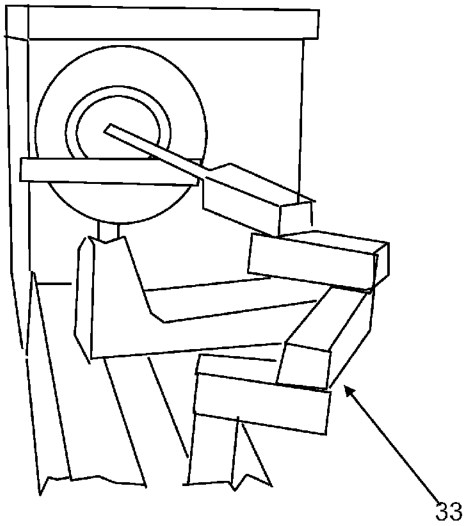
Fig. 1 C
Fig. 1

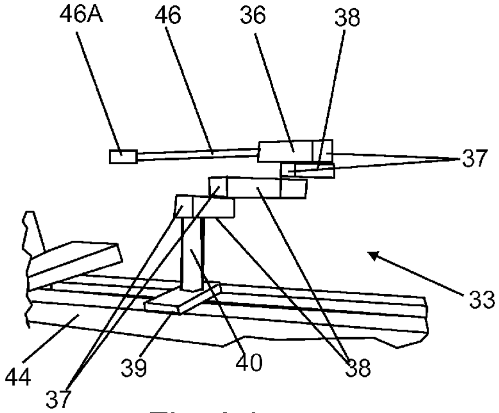
Fig. 3 A
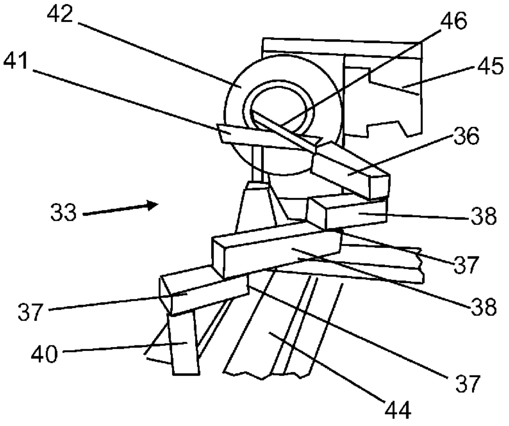
Fig. 3 B
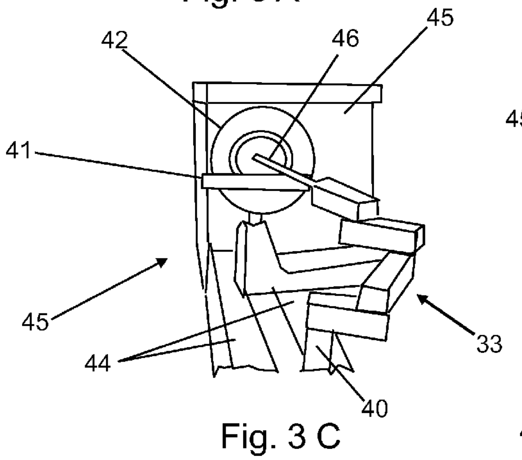
Fig. 3 C
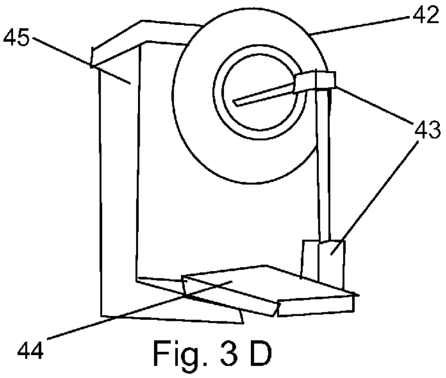
Fig. 3 D
Fig. 3

Fig. 4
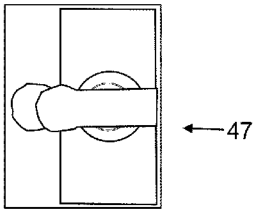
Fig. 4 A
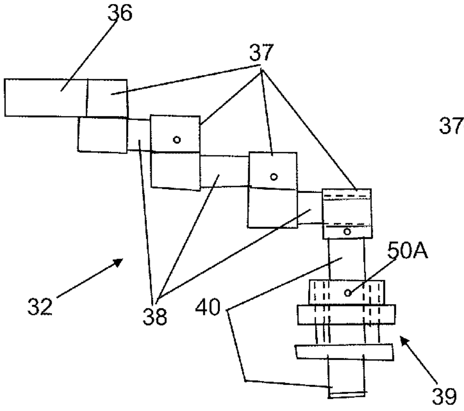
Fig. 4 C
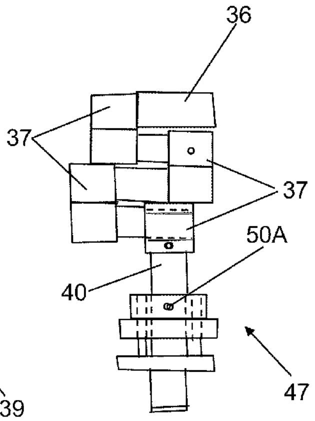
Fig. 4 B
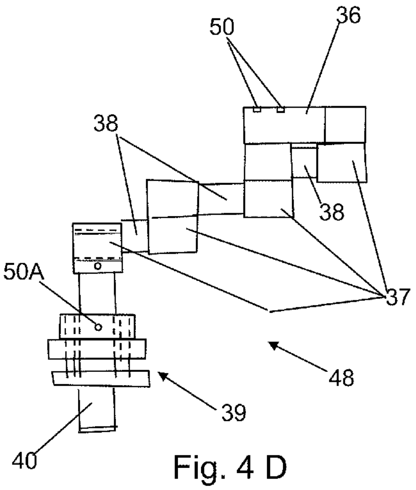
Fig. 4 D

SPECIAL ARTICULATING TOOL HOLDER

CROSS-REFERENCE TO RELATED APPLICATIONS

Not Applicable

This application claims the benefit of Provisional Patent Application Ser. No. 61/004,276 filed Nov. 26, 2007 by Raymond P. Thompson, Wayne A. Crandall, and Jerry A. Arnold and entitled Special Articulating Tool Holder for a Lathe and the Like.

FIELD OF INVENTION

This invention relates to a Special Articulating Tool Holder for a Lathe or the like. Particularly this new device is related to tool and equipment devices used in turning materials such as wood in a machine such as a lathe. This Special Articulating Tool Holder for a Lathe is a new and unique device permits deep hollowing of wood or other materials with a controlled, repeatable method. The preferred and alternative embodiments are described below.

FEDERALLY SPONSORED RESEARCH

None.

SEQUENCE LISTING OR PROGRAM

None.

BACKGROUND

Field of Invention and Prior Art

In the woodworking industry, statistics show that there are diverse and expanding markets for various special tool holders. The industry caters to both professional and hobby activists that need repeatable and high quality tool devices. Industry indicators show the wood turning industry as a fast growing sub-sectors in the U.S. economy.

A. Introduction of the Problems Addressed

In woodworking, deep hollowing for bowls and other vessels is often difficult due to the lack of properly sizes turning tools. The Special Articulating Tool Holder for a Lathe overcomes many of the existing limitations and provides a simple device to permit efficient hollowing "cuts" on a lathe or other turning equipment. The particular combinations of materials and features are unique and novel and are not anticipated by prior art. Likewise, use of a Special Articulating Tool Holder for a Lathe provides significant benefits compared to prior art wood turning tool holders.

B. Prior Art

The historical technology focused mainly on adjusting the position of the work piece and not the tool. Later, complex methods with computer aided manufacturing controlled the location of the tool and tool holder rather than the work piece. Examples of prior devices include U.S. Pat. No. 4,305,439 issued to Skinner (1981) and entitled "Woodworking fixture". This invention teaches a woodworking fixture for positioning and guiding a work piece under a stationary routing head, whereby the work piece is subject to a composite movement as it progresses under the routing head. The fixture comprises an indexing table having a clamp for securing the work piece thereon, mounted on a moveable carriage. The indexing table can be slanted at an adjustable angle and may be rotated as the carriage progresses under the routing head in order to create designs of varying depth into the work piece. This differs in the complexity from the instant Special Articulating Tool Holder for a Lathe in that it is far more complex and moves the work piece and not the tool. By moving the tool, less inertia is created and the entire process becomes simpler.

A further and more recent example of a wood working assist is shown by Yang in U.S. Pat. No. 4,658,485 (1987) and entitled "machine tool with articulated crossbeam". This teaches a machine tool is equipped with a fully articulatable crossbeam arranged between a pair of vertical columns. The crossbeam carries a tool carriage or saddle which is provided with a driven cutting tool element. The cutting tool element engages a work piece clamped on a table between the columns and below the crossbeam. The crossbeam may articulate in mutually perpendicular planes, independently thereof. With this feature, the machine tool is flexible and versatile and may be used by semi-skilled operators with a minimum of training to perform a series of intricate operations easily and conveniently. The device is far more complex than the Special Articulating Tool Holder for a Lathe and has many more parts and adjustments.

Another mechanism is described in U.S. Pat. No. 5,547,319 issued to Pollak (1996) and entitled "machine tool apparatus having a work piece support table supported by an articulating arm". This device shows a machine tool apparatus having a work piece support table supported by an articulating arm. The machine tool apparatus includes a stand and a motor mounted to the stand. A movable cutting tool holder is provided and a transmission mechanism is drivingly coupled between the motor and the cutting tool holder on the stand. The apparatus also includes a work piece support table and a table positioning support movably coupled to the stand. Part of the table is a positioning support that projects outwardly from the stand. The apparatus further includes an arm having first and second ends. The first end of the arm is pivotably coupled with the projecting part of the table positioning support. The second end of the arm is rotatably coupled with the work piece support table. This teaches moving the work piece and not the tool holder and tool.

A later device is shown by Libbey, et al. in U.S. Pat. No. 7,055,789 (2006) and is entitled "articulating tool arm with positional feedback". This demonstrates a power hand-tool support apparatus includes a multi-component articulating arm with pneumatic lifting assist to hold the hand-tool and protect the operator from tool induced torque, the apparatus equipped with positional feedback optical encoders, to communicate with a dedicated control unit to define a selectable datum position of the hand-tool in the work-space with a lock-out of the tool if the positions do not comply with programmed tightening sequences on bolt patterns.

Finally a patent is shown by Thiessen in U.S. Pat. No. 7,325,777 (2008) and entitled "portable articulating tool support". The device teaches a portable multiple-component articulating support apparatus for engaging, moving, orientating and manipulating a hand-operated power tool within and throughout a three-dimensional workspace. The apparatus includes a clamping device for demountable engagement with a structural element, an elongate double-link hinge member, a spacer arm having opposite ends adapted for detachable engagement and rotational communication with the clamping device and the double-link hinge member, a vertically disposed pivotably connected counterbalance arm assembly adapted for detachable engagement and rotational communication with the double-link hinge member. The counterbalance arm assembly is equipped with a gas-charged cylinder for balancing the weight of hand-operated power tools. The clamping device, spacer arm, double-link hinge and counterbalance arm assembly are interconnected with removable hinge pins. A tool-mounting bracket is provided for grippingly engaging a power tool. The tool-mounting bracket pivotably engages a power tool-bearing member which slidingly and rotatably communicates with the counterbalance arm assembly.

A publication on a website elbotool.com in 2008 shows a device designed to build hollow vessels on a wood lathe. It is fastened to the quill in the tailstock by a clamping system to restrain the tool in all but the horizontal plain. The cutting edge is placed to minimize catches. The tool is designed to accommodate some hollowing tools and cutters. The basic tool reportedly comes ready to use. The device lacks the versatility for mounting offered by the Special Articulating Tool Holder for a Lathe and the like. Other restrictions and shortfalls will be easily understood by those skilled in the art of woodworking devices.

As far as known, there is no other Special Articulating Tool Holder for a Lathe at the present time which fully provides these improvements and functional characteristics as the present Special Articulating Tool Holder for a Lathe. It is believed that this device is made with physical features to provide more functionality when compared to other currently utilized lathe tool holders and other devices in the field of woodworking with lathes and the like.

SUMMARY OF THE INVENTION

A Special Articulating Tool Holder for a Lathe has been developed and designed to provide a unique feature and combination that are specifically related to holding tools for turning wood items, especially for deep hollowing turns. The new device presents a simple manner or means for that professional or hobbyist to complete deep hollowing cuts for wood items such as bowls. The device or apparel is made of high quality materials.

The preferred embodiment of the Special Articulating Tool Holder for a Lathe is comprised of multiple (two or more) Articulating joints; the first of the multiple articulating joints is secured to a tool holder with features to hold cutting tools; the last of the multiple articulating joints is secured to an essentially vertical Mounting post; the mounting post is held in place by a base means which mounts either horizontally or vertically to the machine (lathe bed) base as determined by the machine (lathe) configuration. The features to hold tools anticipate an end effector tool that secures an insert able tool cutter.

OBJECTS AND ADVANTAGES

There are several objects and advantages of the Special Articulating Tool Holder for a Lathe. There are currently no known tool cutting holder that extends and retracts by means of full 360 degree rotational features. No other tool holder is as effective at providing the objects of this invention.

The following TABLE A summarizes various advantages and objects of the Special Articulating Tool Holder for a Lathe. This list is exemplary and not limiting to the many advantages offered by this new device.

TABLE A

Various Benefits, Advantages and Objects
This device:

| ITEM | BENEFIT |
|---|---|
| 1. | Allows for the longest stroke per bed length of any constrained system available |
| 2. | The reduced vibration allows persons with joint disabilities to turn without discomfort |
| 3. | Is the only system to mount to machine base |
| 4. | Requires no new processes for manufacture. |
| 5. | Has less torque and vibration than hand held system |
| 6. | Allows tool to be moved to neutral position without dismounting |
| 7. | Has a greater angle of attack than any mounted system |
| 8. | Has a greater range of motion than any mounted system |
| 9. | Is easy to package. |
| 10. | Can be sold and distributed retail, wholesale, or E-commerce internet sales from a website. |
| 11. | Is easy to transport. |

Noteworthy is that other advantages and additional features of the present Special Articulating Tool Holder for a Lathe will be more apparent from the accompanying drawings and from the full description of the device. For one skilled in the art of wood working tools and equipment especially turning devices, it is readily understood that the features shown in the examples with this device are readily adapted for improvement to other types of tool devices for use with wood working and other turning tools.

DESCRIPTION OF THE DRAWINGS

Figures

The accompanying drawings, which are incorporated in and constitute a part of this specification, illustrate a preferred and alternative embodiments for the Special Articulating Tool Holder for a Lathe. The drawings together with the summary description given above and a detailed description given below serve to explain the principles of the Special Articulating Tool Holder for a Lathe. It is understood, however, that the device is not limited to only the precise arrangements and instrumentalities shown.

FIGS. 1A, 1B, and 1C are an isometric computer model drawings, sketches and a sketch of the prototype of the Special Articulating Tool Holder for a Lathe that depict the general preferred embodiment for the Special Articulating Tool Holder for a Lathe.

FIGS. 3A through 3D are sketches that show the prototype of the Special Articulating Tool Holder for a Lathe with additional details and features of the preferred embodiment.

FIGS. 4A through 4D are sketches of the Special Articulating Tool Holder for a Lathe that show common details for the device.

DESCRIPTION OF THE DRAWINGS

Reference Numerals

Figures 2, 2A, 2B, 2C:
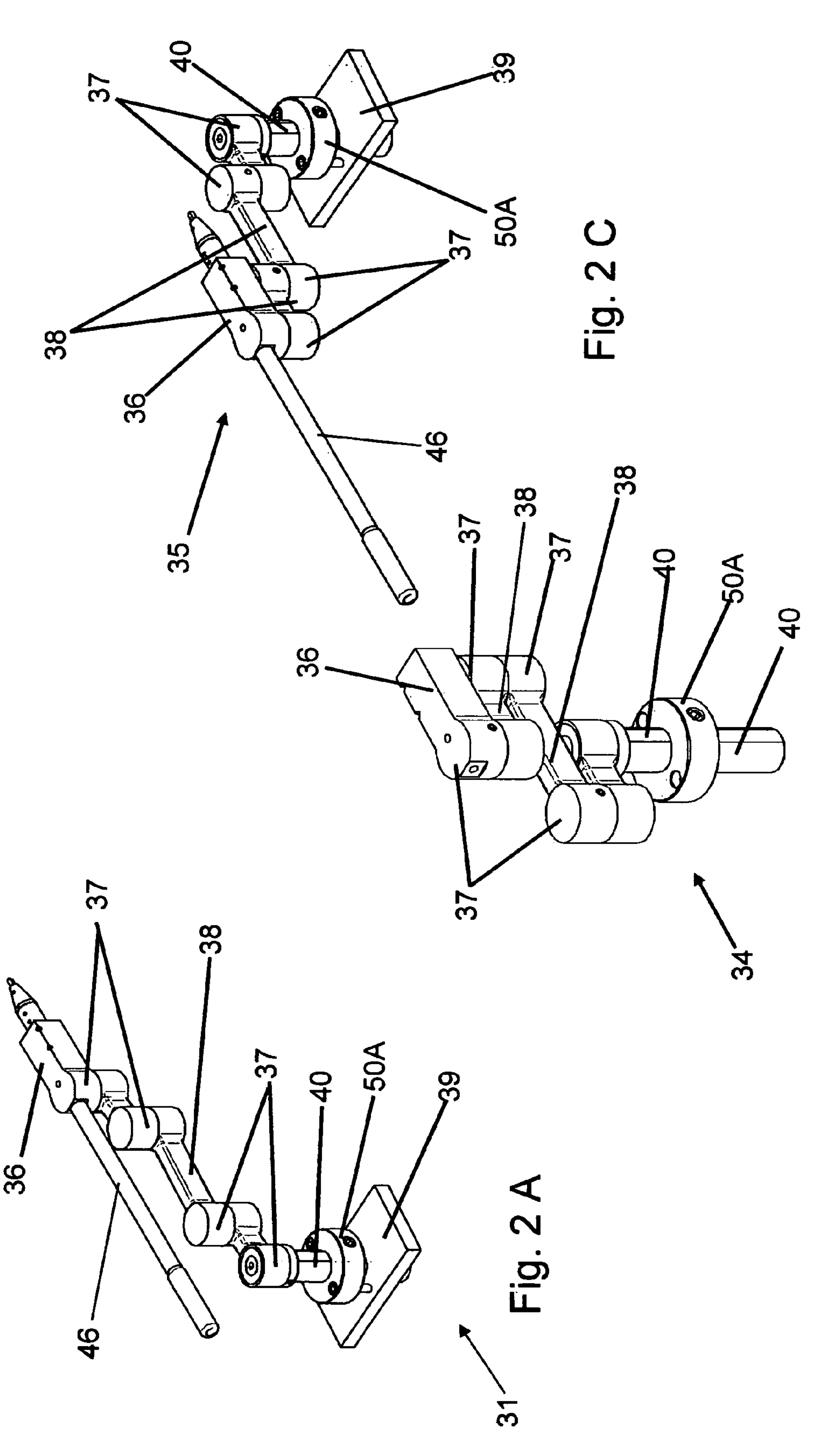
FIGS. 2A through 2C are an isometric computer model drawings that show details and features of the preferred embodiment of the Special Articulating Tool Holder for a Lathe.
Figure 5:
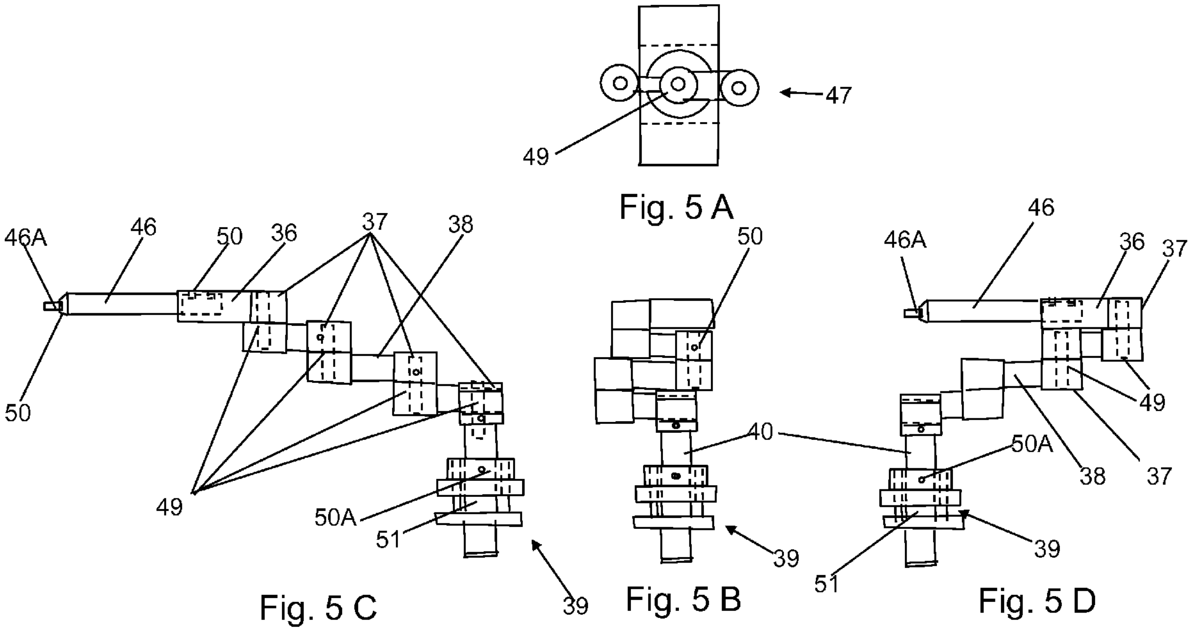
FIGS. 5A through 5D are sketches with additional details for the Special Articulating Tool Holder for a Lathe.

The following list refers to the drawings:

| Ref # | Description |
|---|---|
| 30 | Special Articulating Tool Holder for a Lathe or the like |
| 31 | Computer model of a Special Articulating Tool Holder for a Lathe and the Like in the extended position |
| 32 | A sketch of a Special Articulating Tool Holder for a Lathe and the Like in the extended position |
| 33 | A prototype of a Special Articulating Tool Holder for a Lathe and the Like in the extended position |
| 34 | Computer model of a Special Articulating Tool Holder for a Lathe and the Like in the folded position |
| 35 | Computer model of a Special Articulating Tool Holder for a Lathe and the Like in the retracted position |
| 36 | Tool holder device |
| 37 | Articulating joint |
| 38 | Support bar essentially horizontal |
| 39 | Means to mount the Articulating Tool Holder (Horizontal or vertical) |
| 40 | Post to hold articulating tool holder (essentially vertical) |
| 41 | Tool rest |
| 42 | Work piece (item being cut) |
| 43 | Depth measurement device |
| 44 | Bed of the lathe or machine base |
| 45 | Turning lathe |
| 46 | End effecter tool |
| 46A | Insert able tool cutter |
| 47 | Sketch of folded articulating tool |
| 48 | Sketch of retracted articulating tool |
| 49 | 360 degree rotatable swivel means such as a bearing, bushing, concentric rings or the like |
| 50 | Securing means - set screw, tapered jaws, clamp or the like |
| 50A | Adjustable securing means |
| 51 | Means to secure base such as clamps, fasteners or the like |

DETAILED DESCRIPTION OF PREFERRED EMBODIMENT

The present invention presented is a Special Articulating Tool Holder for a Lathe 30. Particularly the preferred embodiment of the Special Articulating Tool Holder for a Lathe 30 is related to devices and methods that provide a unique combination which has been specifically configured to easily and securely hold lathe cutters with full, deep hollowing abilities for turning and other cutting operations. The preferred embodiment of the Special Articulating Tool Holder for a Lathe 30 is comprised of multiple (two or more) Articulating joints 37; the first of the multiple articulating joints 37 is secured to a tool holder 36 with features to hold cutting tools 46, 46A; the last of the multiple articulating joints 37 is secured to an essentially vertical Mounting post 40; the mounting post 40 is held in place by a base means 39 which mounts either horizontally or vertically to the machine (lathe bed 44) base as determined by the machine (lathe 45) configuration. The features of the tool holder 36 to hold tools anticipate an end effector tool 46 that secures an insert able tool cutter 46A. The preferred embodiment comprises four (4) articulating joints 37.

There is shown in FIGS. 1-5 a complete detail and operative embodiment of the Special Articulating Tool Holder for a Lathe 30. The operation of the Special Articulating Tool Holder for a Lathe 30 is discussed below in the Operations section.

The advantages for the Special Articulating Tool Holder for a Lathe 30 are listed above in the introduction. Succinctly the benefits are the device:

- Allows for the longest stroke per bed length of any constrained system available
- The reduced vibration allows persons with joint disabilities to turn without discomfort
- Is the only system to mount to machine base
- Requires no new processes for manufacture.
- Has less torque and vibration than hand held system
- Allows tool to be moved to neutral position without dismounting
- Has a greater angle of attack than any mounted system
- Has a greater range of motion than any mounted system
- Is easy to package.
- Can be sold and distributed retail, wholesale, or E-commerce internet sales from a website.
- Is easy to transport.

The accompanying drawings, which are incorporated in and constitute a part of this specification, illustrate a preferred embodiment of the Special Articulating Tool Holder for a Lathe 30. The drawings together with the summary description given above and a detailed description given below serve to explain the principles of the Special Articulating Tool Holder for a Lathe 30. It is understood, however, that the device 30 is not limited to only the precise arrangements and instrumentalities shown.

FIGS. 1A, 1B, and 1C are an isometric computer model drawings, sketches and a sketch of the prototype of the Special Articulating Tool Holder for a Lathe 30 that depict the general preferred embodiment for the Special Articulating Tool Holder for a Lathe 30. FIG. 1A shows the isometric computer model 31 in the extended position as if it were providing a tool cutter 46A for a deep cut. FIG. 1B is a sketch 32 of the Special Articulating Tool Holder for a Lathe 30. Details are described below. FIG. 1C is a sketch of the prototype 33 of the Special Articulating Tool Holder for a Lathe 30.

FIGS. 2A through 2C are isometric computer model drawings that show details and features of the preferred embodiment of the Special Articulating Tool Holder for a Lathe 30. FIG. 2A is the extended model of the Special Articulating Tool Holder for a Lathe 30. Here the device 30 is full extended to permit a deep cut into the intended work piece 42 (not shown). In this view, the tool holder 36 is connected to the first articulating joint 37. The holder 36 shows an end effecter tool 46 secured within its aperture means for removably securing the tool 46. Multiple joints 37 are connected to separating bars 38 which are essentially horizontal or parallel to the ground. The last joint 37 is connected securely to the mounting post 40. The mounting post 40 is essentially vertical to the ground. The mounting post 40 is secured to a base means 39 that attaches the whole device 30 to the machine/lathe 45 bed 44. In FIG. 2B the same tool device 30 is shown in a folded position 34. The same parts as described above are present. In FIG. 2C, the device 30 is in a retracted position 35. Here the joints 37 have permitted the bar supports 38 to be rotated away from the work piece 42 and the tool holder 36 is positioned away from the work piece 42. The overall scope of the device permits the bars 38 to be of varying lengths to permit the deep cuts with the tool 46A and tool holder 36. One skilled in the art of tool devices such as shown here may be of differing variations. The bars 38 might be a tubular structure with a square, rectangular, oval, circular or other geometrical cross section. A square configuration is preferred. Likewise the base means 39 (not shown) interconnects to the vertical post 40 and securement means 50A and the base 39 may vary to match an horizontal or vertical machine base surface 44 and still be well within the scope and spirit of the Special Articulating Tool Holder for a Lathe 30. One sees in FIG. 2C that the post 40 may be vertically adjusted by the securement means 50A. This means 50A may be by a set screw, a removable keyway, a threaded lock or other means to loosen the post 40 from the base 39, move the post 40 to a desired position, and then re-secure the post 40 to the base means 39 in a rigid, secure fashion.

FIGS. 3A through 3D are sketches that show the prototype 33 of the Special Articulating Tool Holder for a Lathe 30 with additional details and features of the preferred embodiment. FIG. 3A shows the device 30 in a retracted position. The device 30 is mounted to the lathe 45 on its 45 base 44. The remaining components are described above in the computer model drawings. FIG. 3B shows the prototype 33 in an extended position. Here the end effector 46 that holds the cutter 46A (not shown) is extended to where the tool is deep into the interior of the work piece 42 to permit controlled hollowing out of the piece 42. One notes the recommended tool rest 41 be used in conjunction with the Special Articulating Tool Holder for a Lathe 30 and the lathe 45. FIG. 3C is another view of the extended Special Articulating Tool Holder for a Lathe 30. FIG. 3D is a view of the work piece 42 being checked for depth of cut by a measurement device 43. One skilled in the art of tool devices well appreciates the various types of materials that are suitable for the components of the Special Articulating Tool Holder for a Lathe 30. Certainly they may be of various metals including, but not limited to steel, steel alloys, aluminum, brass and the like. These may be cast and machined by secondary operations or machined as a primary manufacturing operation. Likewise, a high strength composite material including high strength plastics may be suitable for this device 30 or its components.

FIGS. 4A through 4D are sketches of the Special Articulating Tool Holder for a Lathe 30 that show common details for the device. The component devices, configurations and materials have been described above and are incorporated by reference here as if repeated verbatim. Of importance, one notes the securement means 50A for adjusting the post 40 and base means 39. Likewise, the securement means 50 for the tool holder 36 and end effector tool 46 (not shown).

FIGS. 5A through 5D are sketches with additional details for the Special Articulating Tool Holder for a Lathe 30. The component devices, configurations and materials have been described above and are incorporated by reference here as if repeated verbatim. The important additions here include the 360 degree rotatable swivel means 49 which is the enablement for the articulating joint 37 to be able to move and rotate the full 360 degrees. This is unique to the Special Articulating Tool Holder for a Lathe 30 from other lathe tools. The rotatable swivel means 49 may be by various rotatable swivel means 49 such as a bearing—ball or roller, bushings, concentric ring-like structural members or the like. Other rotatable and bearing features would be well within the scope and spirit of the Special Articulating Tool Holder for a Lathe 30.

All of the details mentioned here are exemplary and not limiting. Other components specific to describing a Special Articulating Tool Holder for a Lathe 30 may be added as a person having ordinary skill in the wood working tools and equipment industry well appreciates.

Operation of the Preferred Embodiment

The preferred embodiment for the Special Articulating Tool Holder for a Lathe 30 has been described in the above paragraphs. The manner of how the device operates is described below. One skilled in the art of tool devices and related equipment for turning materials such a wood will note that the description above and the operation described here must be taken together to fully illustrate the concept of the Special Articulating Tool Holder for a Lathe 30.

The preferred embodiment of the Special Articulating Tool Holder for a Lathe 30 is comprised of multiple (two or more) Articulating joints 37; the first of the multiple articulating joints 37 is secured to a tool holder 36 with features to hold cutting tools 46, 46A; the last of the multiple articulating joints 37 is secured to an essentially vertical Mounting post 40; the mounting post 40 is held in place by a base means 39 which mounts either horizontally or vertically to the machine (lathe bed 44) base as determined by the machine (lathe 45) configuration. The features of the tool holder 36 to hold tools anticipate an end effecter tool 46 that secures an insert able tool cutter 46A. These features and details of the device 30 are described above.

For one to use the Special Articulating Tool Holder for a Lathe 30 one would mount the base means 39 to the lathe 45 at its bed 44. Next, the vertical post 40 would be roughly adjusted to a height for the tool 30 in relation to the tool rest 41 and work piece 42. Next the Special Articulating Tool Holder for a Lathe 30 would be extended so the tool cutter 46A would be close and contiguous to the work piece 42. The post 40 would be adjusted up or down according to the position of the cutter 46A and the work piece 42. With the adjustment complete, the post 40 would be secured by the means 50A to hold the vertical alignment. The articulating joints 37 would be used to pull the tool cutter away from the work piece 42. The lathe 45 would be activated or energized, then the cutter 46A would be urged toward the work piece 42 by means of the Special Articulating Tool Holder for a Lathe 30.

With the above description it is to be understood that the Special Articulating Tool Holder for a Lathe 30 is not to be limited to only the disclosed embodiment. The features of the Special Articulating Tool Holder for a Lathe 30 are intended to cover various modifications and equivalent arrangements included within the spirit and scope of the description.

What is claimed as new and desired to be protected by Letters Patent is:

1. A special articulating tool holder made of durable material for a Lathe comprised of (a) multiple bushings with full 360 degree rotation;

(b) a tool holder with features to hold an end effector and cutting tool;

(c) a means for securing the first of the multiple bushings to the tool holder;

(d) an essentially vertical mounting post;

(e) a means for securing the last of the multiple bushings to the mounting post; and (f) a base means for securing the mounting post to a machine wherein the special device may be used to secure an insert able cutter and used for controlled and repeatable deep inner and hollow cuts for lathes and woodworking tools and equipment.

2. A special articulating tool holder made of durable material for a lathe comprised of (a) multiple bearings with full 360 degree rotation;

(b) a tool holder with features to hold an end effector and cutting tool;

(c) a means for securing the first of the multiple bearings to the tool holder;

(d) an essentially vertical mounting post;

(e) a means for securing the last of the multiple bearings to the mounting post; and (f) a base means for securing the mounting post to a machine wherein the special device may be used to secure an insert able cutter and used for controlled and repeatable deep inner and hollow cuts for lathes and woodworking tools and equipment.

3. The device according to claim 2 wherein the bearing is a roller bearing.

4. The device according to claim 2 wherein the bearing is a ball bearing.

* * * * *